United States Patent
Agarwal et al.

(10) Patent No.: US 7,526,443 B2
(45) Date of Patent: Apr. 28, 2009

(54) METHOD AND SYSTEM FOR COMPUTER-IMPLEMENTED TRADING OF SECONDARY MARKET DEBT SECURITIES

(75) Inventors: Brijesh Agarwal, Glen Ridge, NJ (US); Rachel Moseley, Scarsdale, NY (US); Richard J. Schiffman, Tenafly, NJ (US)

(73) Assignee: MarketAxess Holdings Inc., New York, NY (US)

( * ) Notice: Subject to any disclaimer, the term of this patent is extended or adjusted under 35 U.S.C. 154(b) by 678 days.

(21) Appl. No.: 10/779,082

(22) Filed: Feb. 13, 2004

(65) Prior Publication Data

US 2004/0172356 A1 Sep. 2, 2004

Related U.S. Application Data

(63) Continuation of application No. 10/026,359, filed on Dec. 24, 2001.

(60) Provisional application No. 60/257,807, filed on Dec. 22, 2000.

(51) Int. Cl.
*G06Q 40/00* (2006.01)
(52) U.S. Cl. ............................................. 705/35; 705/37
(58) Field of Classification Search .............. 705/10–44
See application file for complete search history.

(56) References Cited

U.S. PATENT DOCUMENTS

| | | | |
|---|---|---|---|
| 4,903,201 A | | 2/1990 | Wagner |
| 5,497,317 A | * | 3/1996 | Hawkins et al. ............... 705/37 |
| 5,774,880 A | | 6/1998 | Ginsberg |
| 5,809,483 A | * | 9/1998 | Broka et al. ................... 705/37 |
| 5,857,176 A | | 1/1999 | Ginsberg |
| 5,873,071 A | | 2/1999 | Ferstenberg et al. |
| 5,893,079 A | | 4/1999 | Cwenar |
| 5,905,974 A | | 5/1999 | Fraser et al. |
| 5,915,209 A | * | 6/1999 | Lawrence ................... 340/3.7 |
| 6,014,643 A | * | 1/2000 | Minton ..................... 705/36 R |
| 6,029,146 A | | 2/2000 | Hawkins et al. |

(Continued)

OTHER PUBLICATIONS

Extended European Search Report from European Patent Application No. 08001738.1. (Jun. 12. 2007).

(Continued)

*Primary Examiner*—Frantzy Poinvil
(74) *Attorney, Agent, or Firm*—Irah H. Donner; Wilmer Cutler Pickering Hale and Dorr LLP

(57) ABSTRACT

A computer-implemented method and system for trading of debt securities (bonds), where multiple dealers participate and compete on a single platform (100). Dealers and investors have respective interfaces (250, 230) for communicating. In one aspect, dealers announce new debt security issues (400), the investors communicate an indication of interest (IOI) (500) in purchasing the new debt security issues, and the issues are allocated to the investors. In another aspect, issues from multiple dealers are made available to investors on a secondary trading market in a searchable format (1000). In response to price inquiries sent by the investors (1200), the dealers provide offers (1300) which are briefly held and released to the investor concurrently to allow the investor to consider all offers together. In another aspect, the dealers post bid and offer terms for actively traded issues (1700) that are updated in real-time to avoid the need for the inquiry procedure.

32 Claims, 18 Drawing Sheets

U.S. PATENT DOCUMENTS

| | | | |
|---|---|---|---|
| 6,035,287 | A | 3/2000 | Stallaert et al. |
| 6,058,379 | A | 5/2000 | Odom et al. |
| 6,134,535 | A | 10/2000 | Belzberg |
| 6,161,099 | A | 12/2000 | Harrington et al. |
| 6,247,000 | B1 | 6/2001 | Hawkins et al. |
| 6,321,212 | B1 | 11/2001 | Lange |
| 6,343,278 | B1 | 1/2002 | Jain et al. |
| 6,594,643 | B1 | 7/2003 | Freeny, Jr. |
| 6,795,811 | B1 * | 9/2004 | Epstein .................... 705/36 R |
| 7,006,991 | B2 | 2/2006 | Keiser et al. |
| 7,165,045 | B1 | 1/2007 | Kim-E |
| 2002/0059126 | A1 | 5/2002 | Ricciardi |
| 2002/0099645 | A1 | 7/2002 | Agarwal et al. |
| 2002/0111896 | A1 | 8/2002 | Ben-Levy et al. |
| 2002/0128958 | A1 | 9/2002 | Slone |
| 2002/0161690 | A1 | 10/2002 | McCarthy et al. |
| 2003/0033239 | A1 | 2/2003 | Gilbert et al. |
| 2003/0115125 | A1 | 6/2003 | Lee et al. |

OTHER PUBLICATIONS

International Search Report for International Application No. PCT/US01/49290 mailed Oct. 29, 2002.

International Search Report for International Application No. PCT/US04/22424 mailed Mar. 5, 2005.

* cited by examiner

Calendar/Inventory 400

[Home] [Notices] ⇨ [Calendar] [Indications Submitted]

| Title | | | Lead managers | An Dt | Prc Dt | State |
|---|---|---|---|---|---|---|
| Acme Widgets Corp. USD 350,000(000s) Sr Nts 10 yr Fixed A2/A | | | | | | |
| [O] [Prospectus] | [Roadshow] | [Mgmt Grp] | BSC*, JPM* | 11/20 | | Announced |
| Centex USD 150,000 (000s) Notes 10 yr Re-opening.... | | | | | | |
| [O] [Prospectus] | [Roadshow] | [Mgmt Grp] | ABN*,HSB... | 11/26 | | Announced |
| Delhaize America Inc 2,600,000 (000s) 5 year... | | | | | | |
| [O] [Prospectus] | [Roadshow] | [Mgmt Grp] | UBS*, ML | 04/19 | | Launched |
| AOL Time Warner USD 1000,000 (000s) Global Fixed Baa1/BBB+ | | | | | | |
| [O] [Prospectus] | [Roadshow] | [Mgmt Grp] | LEH* | 01/20 | | Subject |
| Anheuser Busch USD 300,000 (000s) SrBd 10... | | | | | | |
| [O] [Prospectus] | [Roadshow] | [Mgmt Grp] | BSC*, CSFB... | 06/22 | 06/22 | Priced |
| Qwest Diagnostics USD 275,000 (000s).... | | | | | | |
| [O] [Prospectus] | [Roadshow] | [Mgmt Grp] | ABN* | 05/10 | 05/25 | Priced |
| Westchester living USD 600,000,000 (000s) | | | | | | |
| [O] [Prospectus] | [Roadshow] | [Mgmt Grp] | ABN*, LEH* | 06/19 | 06/19 | Settled |

[PREVIOUS] [NEXT]

FIG. 4

| Home | Notices | Calendar | Indications Submitted | |
|---|---|---|---|---|
| | | Create Indication of Interest | | 500 |

IOI# 
Title  Acme Widgets Corp. USD 350,000 (000s) SrNt 10....
Lead Mgr(s)  ● BSC*    ○ JPM*    ○ CSFB*
Bookrunner(s)  BSC*    JPM*    CSFB*
Sr Co-Mgr(s)  ○ ABN*    ○ BAS*    ○ DB*    ○ LEH*    ○ UBSW*
Jr Co-Mgr(s)  GS    ML    SSB
● Notify Co-Managers

510

IOI Quantity: [    ] 000s        Level:    ● Market
                                          ○ Limit Spread  [0.0] bp  [0.000] Required Yield
IOI Type:       ● No Minimum  ○ Min Fill  ○ All or None
Auto-Verify:    Automatically Verify IOI at Launch  ● Yes  ○ No
Comments:       will listen to conference call with issuer
Pay Method      ● Cash  ○ Pricing Benchmark  ○ Other Government  ○ Corporate

| Prospectus | | IDs | Sell Restrictions | |
|---|---|---|---|---|
| 350,000 | Maturity | 10 year | Moody's | A2 |
| Fixed | Announce Date | 08/15/01 | S & P | A |
| Semi-annual | Exp Prc Date & Time | 09/05/01 9:00 | Fitch IBCA | NA |
| | Settlement Date | | Min Bid Size | 1 (000s) |
| | Day Count | Actual/360 | Min Denom | 1 (000s) |
| Make Whole Call | Pricing Bmk(1) | UST 5.000 02/15/11 | | 530 |
| Senior Note | | | | |

Ccy/Size
Cpn Type
Cpn Freq
First Cpn
Redemption
Debt Ranking

520

[Submit]  [Cancel]

Home | Calendar | Notices | Indications Submitted

Important Notice for Indication of Interest

No offer to buy the securities can be accepted and no part of the purchase price can be received until the registration statement becomes effective, and any such offer may be withdrawn and revoked without obligation or commitment of any kind, at any time prior to notice of its acceptance given after the effective date. An indication of interest in response to this advertisement will involve no obligation or commitment of any kind.

Accept | Do Not Accept

FIG. 6

Activity Alert

Action: IOI Allocated

Issue: Acme Widgets Corp USD 350,000 (000s) SrNt 8/15/2011 Fixed MW A2/A

MA Dealer: BSC

Invoke "NOW" to view Indications Submitted screen for messages and issue details

[Now] [Dismiss]

710

[Home] [Notices]
[Calendar] ⇒ [Indications Submitted]

Indications Submitted
(All Amounts in (000s))

| Title | Qty | Alloc | Level | IOI Type | Pay Method | Mgr | Prc | Sprd | Subj | Time | IOI# |
|---|---|---|---|---|---|---|---|---|---|---|---|
| Acme Widgets Corp USD 350,000 (000s) SrNt 8/15/2011 Fixed MW A2/A | | | | | | | [CANCEL] | VERIFY ALLOCATION? | | | |
| Allocation is available, please verify | | | | | | BSC | | | | | |
| | 38,000 | 24,000 | Market | NM | Cash | | | | N | 16:35 | 8052 |

720

[DETAIL] [HISTORY]

1 IOI                                    [PREV] [NEXT]

IOI Final Pricing

[Home] [Notices]
[Calendar] [Indications Submitted]

| | | | | |
|---|---|---|---|---|
| Issuer | Acme Widgets Corp. | | | |
| Title | Acme Widgets Debentures | | | |
| Lead Mgr(s) | BSC* | | | |
| Bookrunner(s) | BSC | | | |
| Sr Co-Mgr(s) | | | | |
| Jr Co-Mgr(s) | | | | |
| IOI Quantity | 38,000 (000s) | Level: | Market | Allocation: Pot |
| | No Minimum | | | |
| Swap | | Payment Type: | Cash | Settlement: |
| Auto-Verify | Automatically Verify IOI at Launch | | | |
| Coupon | 8.750 | Maturity | 10 year | Moody's A2 |
| Size | 350,000 (000s) | Announce Date | 08/15/01 | S & P A |
| Cpn Type | Fixed | Sched Pricing Date | 09/01/01 | Fitch IBCA NA |
| Cpn Freq | Semi-Annual | Settlement Date | | Duff & Phelps NA |
| First Coupon | | Pricing Benchmark | UST 5.000 02/15/11 | Min Size IOI 1 (000s) |
| | | | | IOI Increment 1 (000s) |

| Allocation | 24,000 (000s) |
|---|---|
| Price | 99.8625 |
| Spread | 110 |

810

[Accept] [Cancel]

| Home | Notices | | | | |
| Calendar | Indications Submitted | | | | |

Indication History
ACME WIDGETS CORP 7.253 350,000 (000s) Due 08/15/2011

Mgr: JPM

Sprd: 110.0
Price: 99.8625

| QTY (000s) | Alloc | Level | IOI Type | Method | Time |
|---|---|---|---|---|---|
| Your price has been confirmed. | | | | | |
| 38,000 | 24,000 | Market | No Min | Cash | 13:38 |
| Your allocation has been verified. | | | | | |
| 38,000 | 24,000 | Market | No Min | Cash | 13:37 |
| Allocation is available, please verify. | | | | | |
| 38,000 | 24,000 | Market | No Min | Cash | 13:36 |
| Your IOI has been verified | | | | | |
| 38,000 | 0 | Market | No Min | Cash | 10:40 |
| Please review your IOI and re-verify | | | | | |
| 38,000 | 0 | Market | No Min | Cash | 10:35 |
| Your IOI has been submitted | | | | | |
| 38,000 | 0 | Market | No Min | Cash | 10:30 |

6 states

[PREV] [NEXT]

FIG. 9

Inventory (Offers) 1000

⇑ [US High Grade] [USD Eurobond] [EUR Eurobond]    [Activity]    [Blotter]
⇑ [Inventory] [Trade]

Filters   • Offers
      ○ Bids   ○ Actives   Ticker/Identifier [    ] [Search]    [Advanced] [Clear]

| Sz(000s) | Rating | Issuer | Cpn | Maturity | Sprd | Benchmark | Dir | Update |
|---|---|---|---|---|---|---|---|---|
| $ 5,785 | Ba1/BBB | PSEG ENERGY... | 9.125 | 02/10/04 MW | 319 | UST 4.750 02/04 | LEH | 07:25 |
| $ 2,000 | A1/A+ | CIT GROUP INC | 5.500 | 02/15/04 NC | 120 | UST 5.750 11/05 | DB | 07:55 |
| $ 5,600 | Baa1/NA | PDVSA FINANCE | 8.750 | 02/15/04 MW | 288 | UST 4.250 03/03 | UBSW | 04/17 |
| $ 500 | A2/A | SUNTRUST BANK... | 6.125 | 02/15/04 NC* | 110 | UST 5.750 11/05 | UBSW | 07:26 |
| ⇒$ 6,733 | A3/BBB+ | WORLDCOM INC | 7.550 | 04/01/04 | 217 | | *** | 07:26 |

[PREV]    [NEXT]    1010

FIG. 10

⇒ US High Grade  USD Eurobond  EUR Eurobond      Activity  Blotter
Inventory         Trade

| Rating | Issuer | Ticker | Coupon | Maturity | Identifier |
|---|---|---|---|---|---|
| A3/BBB+ | WORLDCOM INC | WCOM | 7.550 | 04/01/04 MW | 98155KAA |

⇒ Details

| Dealer | Size (000s) | Spread | Benchmark | Updated |
|---|---|---|---|---|
| ABN | | | | |
| BAS | | | | |
| ⇒BSC | x 32,400 | x 215 | UST 5.750 11/05 | 04/17 |
| CSFB | | | | |
| ⇒DB | 2,000 x 3,000 | 230 x 215 | UST 5.750 11/05 | 07:55 |
| JPM | | | | |
| LEH | | | | |
| ⇒UBSW | x 6,733 | x 217 | UST 5.750 11/05 | 07:26 |

[Close]

Inquiry 1200

⇒ US High Grade | USD Eurobond | EUR Eurobond | Activity | Blotter

Inquiry #: ⇒ Trade

Action:  ○ Request Bid
         ● Request Offer

Type:  ● Intend to Trade (Firm Price)
       ○ Indication Only (Subject Price)

| Product | Rating | | Issuer | Ticker | Coupon | Maturity | Identifier | Ticker |
|---|---|---|---|---|---|---|---|---|
| US Domestic Coupon | A3/BBB+ | SD 04/23/2001 | WORLDCOM INC | WCOM | 7.550 | 04/01/04 MW | 98155KAA | WCOM |

Size 5000 (000s)    Type: ● Cash  ○ Cross    Bmark: 6.125 08/31/2002 (c) ⇓

| Dealer | Size (000s) | Sprd to Benchmark | Price Timer |
|---|---|---|---|
| ABN | YES | | |
| BAS | NO | | |
| BSC | YES | | |
| CSFB | YES | | |
| DB | YES | | |
| JPM | NO | | |
| LEH | NO | | |
| UBSW | NO | | |

1210

Due in: 5 min ⇓    ● In competition    SUBMIT    CANCEL    NEW TRADE

Activity Log                                                Status

FIG. 12

Inquiry – FIRM (Dealer's View) 1300

US Domestic Corp
Transaction Type: OFFER, MD
Settlement Date: 04/23/2001

[Inventory] [Activity] [Blotter]

| Inquiry # | Sz (000s) | Issuer | Ticker | Coupon | Maturity | Identifier | Benchmark |
|---|---|---|---|---|---|---|---|
| 00223670 | $ 5,000 | WORLDCOM INC | WCOM | 7.550 | 04/01/2004 | 98155KAA | UST 6.125 08/31/2002 |

From: mcarey at eclientj    Offer Due: 5 minutes

Additional Notes: Client Supplied Benchmark
Non-Inventory item

Benchmark Cross: NO

Status
RESP REQ

RESPONSE:
YOUR OFFER: (Spread) +[192] bps    (Benchmark) vs. UST 6.125 08/31/2002    (Size) for [5,000] 000's    Spread to [Maturity] ⇨

In System: N/A    N/A    N/A    good for [3 min] ⇨

[SUBMIT]   [PASS]   [CLEAR]    [1:46] ---1310

Activity Log
17:03:57 eclientj submits offer for 5,000,000 WCOM 7.550 04/01/2004

FIG. 13

Inquiry

US High Grade | USD Eurobond | EUR Eurobond | Activity | Blotter  1400

Inventory ⇒ Trade

Inquiry #: 000383123   Action: ⇒ Trade   Type: • Intend to Trade (Firm Price)   Ticker: WCOM
○ Request Bid                    ○ Indication Only (Subject Price)
• Request Offer

| Product | Rating | Issuer | Ticker | Coupon | Maturity | Identifier |
|---|---|---|---|---|---|---|
| US Domestic Coupon | A3/BBB+ | WORLDCOM INC | WCOM | 7.550 | 04/01/04 MW | 98155KAA |

Size 5000 (000s)   SD 04/23/2001   Type: • Cash  ○ Cross   Bmark: 6.125 08/31/2002 (c) ⇒

| Dealer | Size (000s) | Sprd | to | Benchmark | Price | Timer | | |
|---|---|---|---|---|---|---|---|---|
| ⇒ABN | YES | 192.0 | M | UST 6.125 08/31/2002 | | 2:56 | COUNTER | ACCEPT |
| BAS | NO | | | | | | | |
| BSC | YES | 191.0 | M | UST 6.125 08/31/2002 | | 2:56 | COUNTER | ACCEPT |
| CSFB | YES | 189.0 | M | UST 6.125 08/31/2002 | | 2:56 | COUNTER | ACCEPT |
| DB | YES | Pass | | | | | | |
| JPM | NO | | | | | | | |
| LEH | NO | | | | | | | |
| UBSW | NO | | | | | | | |

Due in: 5 min ⇒   • In competition        SUBMIT   CANCEL   NEW TRADE   Status: RESP REQ   1410

Activity Log
14:03:13  CSFB (cfsbtrade) offer 5,000,000 @ UST + 189.0, good for 3 minutes
14:03:13  DB (bdb1) passes the offer firm inquiry
14:03:13  BSC (bear1) offer 5,000,000 @ UST + 191.0, good for 3 minutes
14:03:13  ABN (babn1) offer 5,000,000 @ UST + 192.0, good for 3 minutes

FIG. 14

Spot Negotiation

1500

⇒ US High Grade | USD Eurobond | EUR Eurobond | | Activity | Blotter
Inventory | Trade

YOU BOUGHT:

| Inquiry | Size (000s) | Issuer | Ticker | Coupon | Maturity | Identifier |
|---|---|---|---|---|---|---|
| 00032488 | $5,000 | WORLDCOM INC | WCOM | 7.550 | 04/01/2004 | 98155KAA |

At  +192.0  bps vs.  UST 6.125 08/31/2002  for  04/23/2001  from  ABN
   (Spread)         (Benchmark)                  (SD)         (Dealer)

Awaiting Spot

```
SPOT NEGOTIATION
SPOT (Price):    101-200
SPOT (Yield):    4.874
Spread:          192.0
Bond Yield:      6.794
ACCEPT           COUNTER        1
                 0:18
```
1510

Status
DONE-ASC

Activity Log
14:10:35 ABN (babn1) request 101-200 (4.874) spot on UST 6.125 08/31/2002
14:10:22 Offer from ABN (babn1) accepted by eclient}. DONE – Awaiting spot confirmation. Cover @ UST + 191.0 over
14:09:59 CSFB (cfsbtrade) offer 5,000,000 @ UST + 191.0, good for 3 minutes
14:09:59 DB (bdb1) passes the offer firm inquiry

FIG. 15

Price Confirmation

1600

[US High Grade] [USD Eurobond] [EUR Eurobond] [Activity] [Blotter]
[Inventory] [Trade]

Corp Trade Details: YOU BOUGHT   Ticket No.: 00648250-0

| Inquiry | Size (000s) | Issuer | Ticker | Coupon | Maturity | Identifier |
|---|---|---|---|---|---|---|
| 00032488 | $5,000 | WORLDCOM INC | WCOM | 7.550 | 04/01/2004 | 98155KAA |

| Spread | Benchmark | Yield | Dealer | Trader | Trade Date | Time | Sett. Date |
|---|---|---|---|---|---|---|---|
| +192.0 | UST 6.125 08/31/2002 | 6.794 | ABN | babn1 | 04/18/2001 | 14:07 | 04/23/2001 |

| $ Price | Status |
|---|---|
| 99.990 | DONE |

Benchmark Spot Details:

| Benchmark | Price | Yield | Time |
|---|---|---|---|
| UST 6.125 08/31/2002 | 101-200 | 4.874 | 14:07 |

Activity Log
14:11:11 eclientj agrees on the final price @ 99.990. Trade is completed.
14:11:04 ABN (babn1) submits final price @ 99.990 for confirmation
14:10:53 101-200 (4.874) spot on UST 6.125 08/31/2002 accepted by eclientj. Awaiting price confirmation...
14:10:35 ABN (babn1) requests 101-200 (4.874) spot on UST 6.125 08/31/2002

FIG. 16

Actives

⇨ US High Grade    USD Eurobond    EUR Eurobond         Activity    Blotter
  Inventory         Trade           Actives ● All    ○ Financials    ○ Industrials    ○ Utilities    ○ Supra-nationals/Sovereigns    Sort By: Tkr Mty

| | Issue | | Bid x Offer | |
|---|---|---|---|---|
| AOL | 6.125 '06 | JPM | (5) 122.0 x 121.0 | (5) UBSW |
| AOL | 7.625 '31 | CSFB | (5) 144.0 x 135.0 | (5) JPM |
| AWE | 7.875 '11 | JPM | (5) 205.0 x 196.0 | (5) CSFB |
| BAC | 4.750 '06 | BAS | (5) 95.0 x 95.0 | (5) UBSW |
| ... | | | Previous | Next |

Actives

1800

[Inventory] [Trade] [Actives] [Activity] [Blotter]

US High Grade | USD Eurobond | EUR Eurobond

| Dealer | Size | Bid Spread | Offer Spread | Offer Size |
|---|---|---|---|---|
| ABN | | | | |
| BAS | 5,000 | 123.0 | 115.0 | 5,000 |
| BSC | 5,000 | 124.0 | | |
| BNPP | | | | |
| CSFB | 5,000 | 125.0 | 120.0 | 5,000 |
| DB | 5,000 | 123.0 | 119.0 | 5,000 |
| DeKW | 5,000 | 125.0 | 120.0 | 5,000 |
| JPM | 5,000 | 123.0 | 118.0 | 5,000 |
| LEH | 10,000 | 123.0 | 117.0 | 5,000 |
| MS | 5,000 | 122.0 | 119.0 | 10,000 |
| ⇒UBSW | 5,000 | 125.0 | 121.0 | 5,000 |

Buy Order                                                          1810

Issue: AOL 6.125 04/14/2006
Size: 5,000 (000s)          ○ All or None
Spread: 121.0 bps
Benchmark: UST 3.500 11/15/06
Outright: ●                 Cross ○
[SUBMIT]  [CLOSE]

Status

Activity Log

FIG. 18

METHOD AND SYSTEM FOR COMPUTER-IMPLEMENTED TRADING OF SECONDARY MARKET DEBT SECURITIES

BACKGROUND OF THE INVENTION

This application is a continuation of application Ser. No. 10/026,359 filed Dec. 24, 2001.

This application claims the benefit of U.S. provisional patent application No. 60/257,807, filed Dec. 22, 2000, and incorporated herein by reference.

This invention relates generally to a computer-implemented method and a system for enabling investors and dealers to buy or sell secondary market debt securities, also known as bonds, from one another.

Conventionally, bond trading has been performed using three different methods. First, the vast majority (about 99.75%) of bond trading occurs with voice-based discovery and trading, also known as an auction system. With this approach, dealers and investors gather in one location to vocally offer and accept various prices and terms for different bonds. Multiple investors, typically institutional investors, can select a bid from competing dealers. This process suffers obvious disadvantages in that the number of investors and dealers that can be involved is limited. Additionally, a clerk must manually enter information regarding the trades after the fact, which is an error-prone procedure.

Second, a cross-matching system has been used, where anonymous buy and sell offers that are entered are matched by a broker. This approach has the disadvantage that the investors and dealers cannot choose to deal with a specific known party. For example, an investor may prefer to buy from a specific dealer who has successfully filled orders in the past, or where some other pre-established relationship has been developed. Similarly, a dealer may prefer to sell to specific investors, e.g., who have been credit-worthy. Moreover, such transactions are typically conducted by telephone, and thus are time consuming and inefficient.

Third, multiple single-dealer systems have been used, where an investor is required to execute an order with a specific dealer or dealers. However, this requires the investor to contact each dealer, typically by telephone, to determine what inventory and terms are being offered. This is also time consuming and inefficient. Moreover, the terms that are offered can change from minute to minute, and the latest information may not be offered to all investors on an equal basis.

Moreover, with the above approaches, access to new debt security issues by the investors is not uniform since, again, information is typically passed by a word of mouth.

In a related development, various computer-based systems have been developed for the buying and selling of equity securities, such as stocks. Many of these systems are targeted to the individual investor who accesses the system via an Internet web browser. Other systems, which are used by investment houses and serious individual investors such as day traders, use private networks to communicate with market makers, who are typically located at the trading floors of the major stock exchanges. Moreover, some private networks allow trading for individual dealers.

However, the above-mentioned systems do not provide a comprehensive solution for trading debt securities. Accordingly, there is a need for a computer-based method and system for the buying and selling of debt securities which addresses the above and other issues.

SUMMARY OF THE INVENTION

The present invention provides a computer-implemented system for trading of debt securities, including new issues and secondary market issues.

In accordance with the invention, multi-dealer inventory, trading, research and new issue features may be provided to investors for credit markets using a network. The network may employ a secure Internet application, for instance. All types of debt security products may be accommodated, including, without limitation, high-grade bonds, high-yield bonds, emerging market bonds, agency bonds, municipal bonds, and European fixed-income products, including Eurobonds, Pfandbrief (a German security), European high-yield bonds, and European-dominated emerging markets bonds. Moreover, the invention can be adapted for use with future debt security products.

The invention brings together the capabilities and resources of a number of different debt security broker-dealers, and allow investors to purchase the same securities from different dealers. Both new issues (primary market trading) and secondary market trading can be accommodated.

The invention provides the following advantages over single-dealer systems: (a) Consolidates market information in a single location to improve transparency, enhances liquidity by combining market-making commitments, enables the delivery of more new issues by aggregating market share, and combines product/sector niches and areas of expertise; (b) increases competition by enabling all dealers to respond simultaneously to inquiries; and (c) improves efficiency by enabling easy comparison and combining of research ideas and pricing, and by providing a consistent format that speeds information gathering.

Moreover, the invention provides the following advantages over cross-matching systems: (a) provides dealer capital that ensures liquidity from day one/client one by having each dealer maintain a minimum number of issues at all times (e.g., 200 issues), and by combining market share; (b) gives dealers incentives to continue to add value to clients via research and new issue allocations, and by providing incentives for dealers to provide liquidity and sales coverage; (c) enables dealer partners to clear and settle trades, such that the trades are handled by stable back offices that the buyer knows and trusts, so there is no need for the introduction of new startup settlement agents; and (d) supports a business model with no per-transaction commission or fees.

The invention also streamlines all aspects of secondary trading. In particular, online, sortable cross-dealer research is provided to enhance idea generation, and dealers can post their inventory online and respond simultaneously to inquiries to speed price discovery. Investors communicate directly with traders (dealers) online to streamline the negotiation process. The investor can define the benchmark for treasury crossing, which relates to an exchange of securities, to eliminate confusion and price disputes. Furthermore, online, standardized responses and confirmations are provided to promote straight-through processing and improve control process.

The invention provides fast, reliable technology, including a scalable architecture that maximizes capacity, hot standbys that minimize the risk of downtime, and rapid system response time.

The invention further provides a middle and back office that enables dealer partners to handle all trade support and settlement, allows independent cross-dealer (i.e., multi-dealer) position valuation, and provides consistent, exportable confirmations, e.g., using Extensible Markup Language (XML).

The invention enable an easy setup via a download from the web, provide security, e.g., using the Secure Sockets Layer (SSL) and dual-key encryption, provide established backup and recovery procedures, and include third party data services (e.g., information from MoneyLine™ or other financial news services). The invention may also provide a single account agreement that covers trading with all broker-dealer and investor partners (i.e., any partner trading with any other partner).

The invention may be web-implemented, and provide an on-screen user interface at the broker-dealer side and at the investor side that facilitates the use of the above features.

In particular, a method for providing computer-implemented trading for debt securities includes the step of providing respective computer-generated interfaces for a plurality of dealers and a plurality of investors. A network enables messages to be exchanged between the dealer interfaces and the investor interfaces. Moreover, the dealers are enabled to communicate an inventory of debt security issues to the investors via the investor interfaces, and at least a particular investor is enabled to submit an inquiry, via the respective investor interface, for trading (e.g., buying or selling) a particular one of the debt security issues to multiple ones of the dealers. In response to the inquiry submitted thereto, the dealers are enabled to provide respective offers and/or bids, via their respective dealer interfaces. Additionally, the offers and/or bids provided by the dealers are temporarily stored, then released to the particular investor concurrently for consideration thereby. That is, the investor may accept one of the offers or bids, submit a counteroffer, or reject all of the offers. Advantageously, all of the dealer offers or bids can be considered together by the investor. This is particularly useful for securities that are less liquid since it gives the dealers some time to respond to an inquiry.

In a further aspect of the invention, a method for providing computer-implemented trading for debt securities includes the step of providing respective computer-generated interfaces for a plurality of dealers and a plurality of investors. A network enables messages to be exchanged between the dealer interfaces and the investor interfaces. Moreover, the dealers are enabled to communicate an inventory of most actively traded debt security issues, and bid and/or offer terms thereof, to the investors via the investor interfaces. The most actively traded debt security issues are determined from a larger inventory of debt security issues which are traded via the network. Additionally, an investor can submit an order, via the respective investor interface, and based on the inventory, for trading a particular one of the most active debt security issues to a dealers. In response to the inquiry, the dealer can communicate a message to the investor indicating whether it accepts or rejects the offer, via its respective dealer interface.

Advantageously, the bid and/or offer terms of the most actively traded debt security issues is updated substantially in real-time, and the investors are enabled to submit orders, via their respective investor interfaces, to the dealers for trading the most actively traded debt security issues without going through an inquiry procedure. For comparison, with the inquiry procedure, the investors submit inquiries to the dealers regarding an issue, and the dealers respond with an offer. The investor may then accept the offer, submit a counteroffer, or reject the offer.

Corresponding apparatuses are also presented, along with computer program products.

BRIEF DESCRIPTION OF THE DRAWINGS

For a fuller understanding of the invention, reference is made to the following description taken in connection with the accompanying drawings, in which:

FIGS. 4-9 are user interfaces for primary market (new issue) trading of debt securities;

FIG. 4 shows an interface that provides an investor with a calendar/inventory of new issues from multiple dealers;

FIG. 5 shows an interface that provides an investor with details of a particular issue, and allows the investor to create an indication of interest, for a new issue;

FIG. 6 shows an interface that provides a notice to an investor when creating an indication of interest;

FIG. 7 shows an interface that allows an investor to monitor the real-time status of its IOIs;

FIG. 8 shows an interface that displays final pricing information to an investor;

FIG. 9 shows an interface that displays an indication history to an investor;

FIGS. 10-18 are user interfaces for secondary market trading of debt securities in accordance with the present invention;

FIG. 10 shows an interface that allows an investor to selectively view an available inventory of security issues;

FIG. 11 shows an interface that allows an investor to view details of a selected issue;

FIG. 12 shows an interface that allows an investor to enter an inquiry for a selected issue;

FIG. 13 shows an interface that allows a dealer to view and respond to an investor's inquiry;

FIG. 14 shows an interface that allows an investor to view multiple dealer responses to the investor's inquiry, and accept an offer or provide a counteroffer;

FIG. 15 shows an interface that allows an investor to confirm the details of a trade and to enter spot details;

FIG. 16 shows an interface that confirms the price and spot details of a trade;

FIG. 17 shows an interface that allows an investor to view actively traded issues; and FIG. 18 shows an interface that allows an investor to compare the bid and offer of different dealers for an actively traded issue, and to enter a buy order.

DETAILED DESCRIPTION OF THE PREFERRED EMBODIMENTS

The preferred embodiments of the invention are now described with reference to the drawings in the figures.

Figure 1:
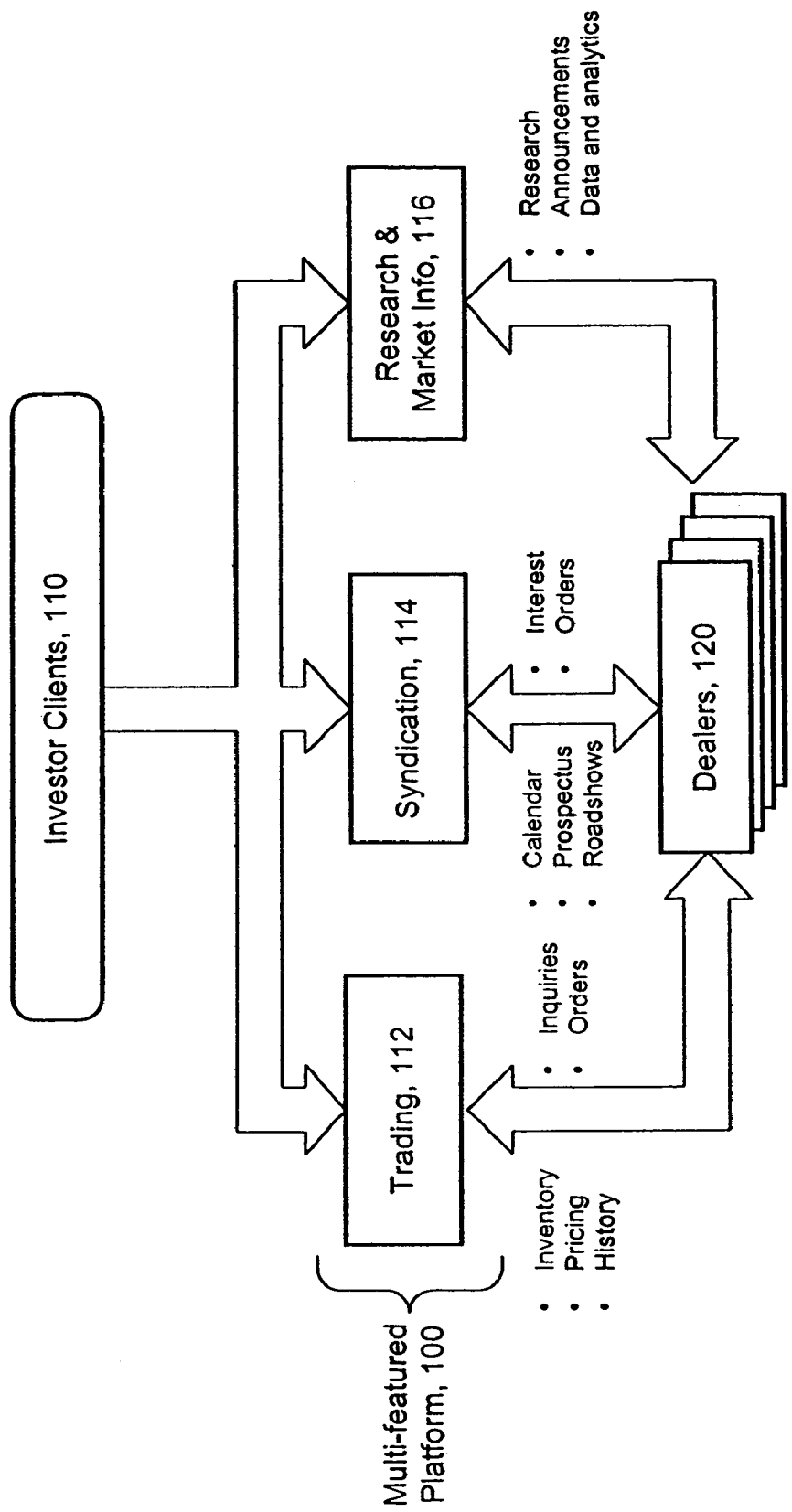
FIG. 1 illustrates an overview of a multi-featured platform.

The on-screen interfaces disclosed herein may use the following acronyms and abbreviations:

Alloc—Allocation
An Dt—Announcement Date
AON—All Or None
ASC—Awaiting Spot Confirmation
BM—Benchmark
bps—Basis points
B/S—Buy/Sell
Ccy—Currency
Cpn—Coupon
Cross—Crossing CUSIP—Committee on Uniform Securities Identification Procedures
Dlr—Dealer
Flg—Flag
GF—Good For
IOI—Indication of Interest
LAN—Local Area Network
LDAP—Lightweight Directory Access Protocol
M—thousand
MF—Minimum Fill
Mgr—Manager
Mgmt—Management
mm—Thousands
Mty—Maturity
Msc—Miscellaneous
MW—Make Whole call
NA—Not Available
NM—No Minimum
Prc Dt—Price or Pricing Date
QA—Quality Assurance
Req—Required
Resp—Response
SD—Single Dealer
Secto—Sector
S & P—Standard and Poor's
Sprd—Spread
Sr Bd—Senior Bond
Sr Nt—Senior Note
Subj—Subject
Sz—Size
T—Trade Date
Tkr—Ticker
TSY— Treasury
Updt—Update
USD—United States Dollars
UST—United States Treasury
Vol.—Volume
YTM—Yield to Maturity FIG. 1 illustrates an overview of a multi-featured platform in accordance with the present invention. Generally, the platform 100 provides computer-implemented trading 112, syndication 114 and research and marketing information 116 functions for a number of investor clients 110 and dealers 120. In one business implementation of the invention, the investors are clients of the organization that runs the platform, while the dealers have partnership arrangements with the organization. The trading functions 112 include providing an inventory of available security issues (bonds), pricing of the issues, and a history of transactions for record-keeping purposes. The trading functions 112 also enable investors to submit inquiries for, and make trades in, secondary market issues.

Syndication generally refers to the process of having a group of banks acting together, temporarily, to underwrite a new issue of bonds. Specifically, the syndication functions 114 include providing a calendar of new issues, including the managers of the issue, details of the issue, such as type of issue, term, coupon, rating, and so forth, the announcement date, and the pricing date. The syndication functions 114 may also include links to on-line prospectuses for the issues, roadshows (marketing presentations). The syndication functions 114 also allow investors to submit indications of interest in the new issues to allow the underwriters/dealers to determine the demand for the issue and set a price. Finally, orders for the new issues may be placed by investors.

The research and marketing information 116 functions may include on-line research reports regarding the issues, announcements, and other data and analytics, which are tools for analyzing issues.

Figure 2:
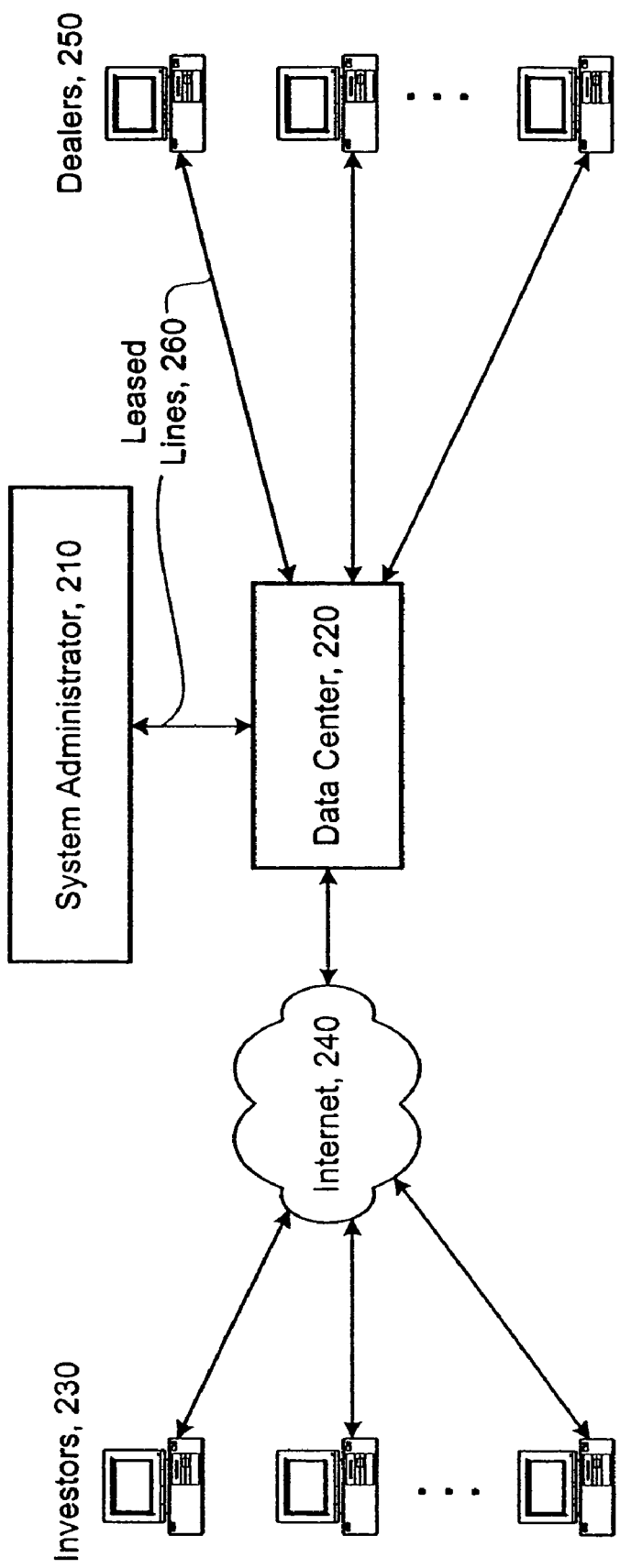
FIG. 2 illustrates a high level system diagram.

FIG. 2 illustrates a high level system diagram in accordance with the present invention. Here, a data center 220 includes a number of centralized computing resources for storing, processing and routing data between the investors' computers 230 and the dealers computers. Specifically, the data center 220 and computers 230, 250 may employ any known type of computing hardware and software that should be apparent to those skilled in the art for carrying out the functions described herein. The investor and dealer computers 230, 250 may be personal computers or workstations, for example, while the data center 220 may employ known servers, backup storage devices, network communications devices and so forth (see FIG. 3 for further details). Generally, a networked application may be written using any available programming language for running at the data center 220, and at the computers 230, 250. The data center 220 provides a central clearinghouse for the dealers and investors, and is typically located remotely. A system administrator 210 oversees and maintains the data center 220.

A computer program product such as an optical or magnetic data storage device may be provided that includes software for programming the computers to perform the desired functions. The product may include a computer usable medium having computer readable program code means embodied therein for providing the desired functions.

In one possible implementation, the investors 230 communicate with the data center 220 via a secure Internet network 240. The dealers 250 may communicate with the data center 220 via secure leased lines 260. Of course, other variations are possible, but the implementation shown is believed to be appropriate for situations where the number of dealers 250 is relatively small, and the number of investors 230 is relatively large.

Figure 3:
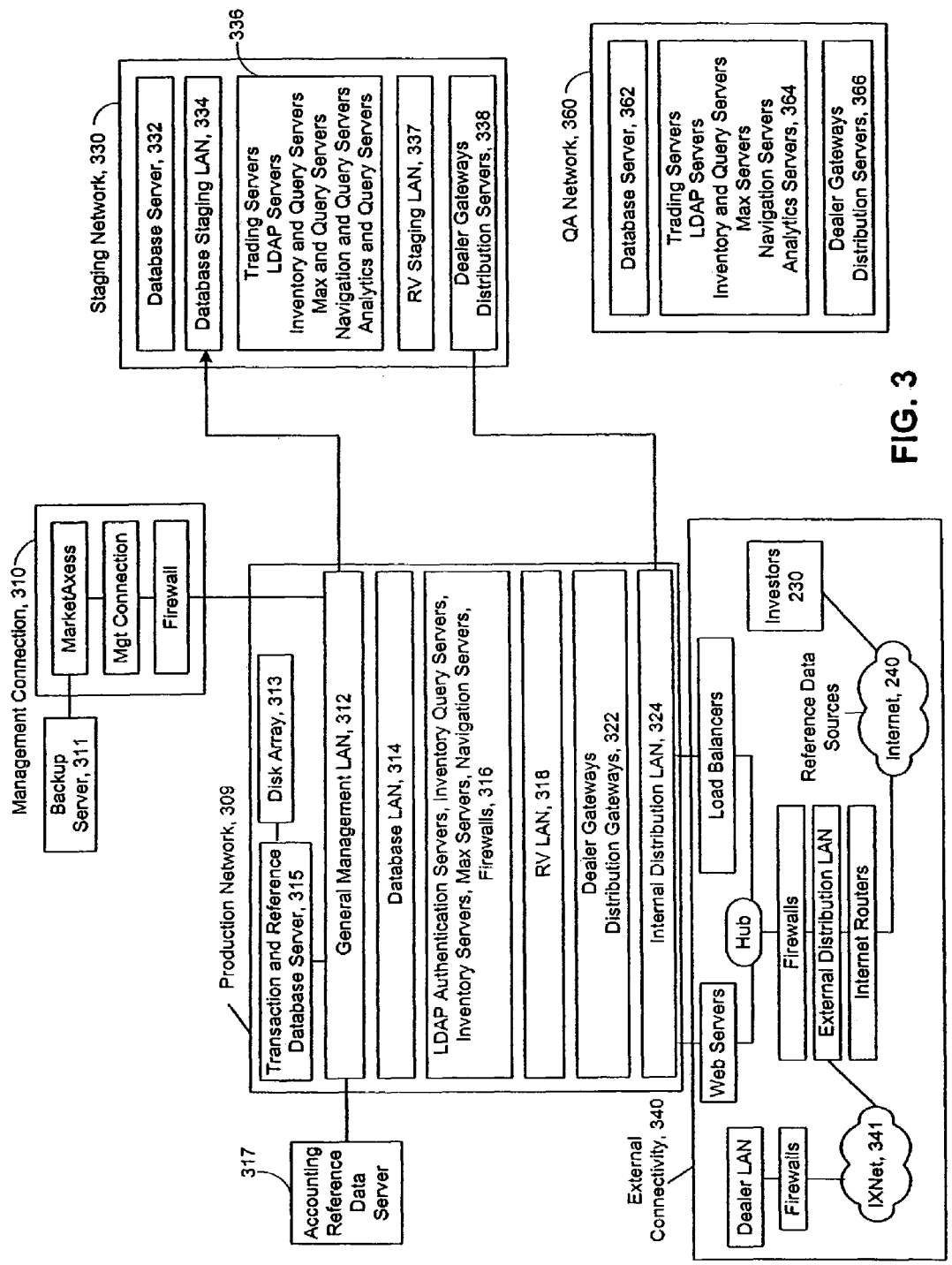
FIG. 3 illustrates a more detailed system diagram.

FIG. 3 illustrates a more detailed system diagram in accordance with the present invention. The figure illustrates a production environment. The system includes a management connection function 310, including a MarketAxess function, which has tools for monitoring and maintaining the system. The function 310 communicates with a general management LAN 312 in a production network 309 via respective management connections and firewalls. A backup server 311 may be provided for storing data from the MarketAxess function.

A disk array 313 provides data storage for a transaction and reference database server 315. This server records details of all transactions between investors and dealers, as well as reference information for the securities. For example, the server may be a Sun 4 CPU 450 MHz with 2×18 GB internal storage. The general management LAN 312 is also accessed by a server 317, such as the Pivotal™ accounting and reference server.

A staging network 330 includes a database server 332, a database staging LAN 334, servers 336, a staging LAN 337, such as the Rendezvous (RV) made by Tibco, and dealer gateways and distribution servers 338. The database staging LAN 334 communicates with the general management LAN 312, while the dealer gateways and distribution servers 338 communicate with the internal distribution LAN 324.

An arrangement for external connectivity 340 is also provided, which communicates with the production network 309 via the internal distribution LAN 324. The internal distribution LAN 324 and general management LAN 312 communicate via deal gateways and distribution gateways 322, and RV LAN 318, servers 316, and a database LAN 314. The external connectivity 340 includes equipment for communicating with the deals and investors. The IXNet network 341 in the external connectivity section 340 indicates an example of a private network used to communicate with the dealers. The Internet 240 communicates with the investors 230, and receiver reference date source information.

A quality assurance (QA) function 360 may also be provided for monitoring quality in the other devices. This function 360 includes a database server 362, servers 364, and dealer gateways and distribution servers 366.

FIGS. 4-9 are user interfaces for primary market (new issue) trading of debt securities in accordance with the present invention.

FIG. 4 shows an interface 400 that provides an investor with a calendar/inventory of new issues from multiple dealers. The interface shows a cross-dealer new issue calendar, which lists the available issues from the different dealers. Advantageously, the investor has immediate access to a multi-dealer inventory of new issues. Moreover, the issues may be sorted base on various criteria, such as issue name, manager, announcement or pricing date, and so forth. The investor thus does not have to consult each manager separately to see what issues they have. Note that the button "calendar" has been activated to provide the display, as designated by the right arrow (⇒). This notation will be used in other figures as well to indicate a button that has been selected.

New issues are placed on the calendar (e.g., announced) prior to the time they are priced. For each issue, the issue name is given (e.g., Acme Widgets Corp.), along with the size of the issue (in thousands of dollars), and details regarding the issue (e.g., type of note, term, rating, and so forth). Moreover, one or more lead managers are designated, discussed further below. Here, the lead managers are BSC (Bear Stearns Corp.) and JPM (J.P. Morgan Chase). The other abbreviations and acronyms under "Lead managers" denote other examples of financial services organizations. The asterisk next to the manager's name indicates they are available to receive IOIs via the system.

The status or state of the issue is also indicated by the calendar. Generally, an issue is announced, then priced, then launched, then settled. "Announced" indicates that details of the issue have been made available to investors via the system. "Priced" indicates a preliminary price has been established for the issue based on the level of interest shown by the investors following the announcement. "Launched" indicates the issue is currently being distributed. "Settled" indicates the transactions for the issue are completed. "Subject" indicates the information regarding the issue is subject to change. The announcement date (An Dt) is provided along with the Pricing Date (Prc Dt). For issues that have been just recently announced, a pricing date may not yet be determined. The announcement date may be the same or earlier than the pricing date.

The name of the issue may be provided as a hyperlink to a new screen that provides full details regarding the issue, including price talk. Price talk refers to comments related to the price that have been made. The additional details may include the coupon, maturity, rating, benchmark, and bookrunner. The bookrunner is the managing underwriter for a new issue, and maintains the book of securities sold. The new screen can appear when the investor selects the hyperlink, e.g., by clicking on it with a mouse or the like.

Also, for the issues that have not yet been priced, a widget such as a button may be provided to allow the investor to submit an indication of interest (IOI) to a dealer. The investor may also select information such as a prospectus or roadshow (marketing pitch) regarding the issue, or obtain details on the management group of the issue, such as the personnel who are managing it.

For example, for the issue "Anheuser Busch", the announcement date (An Dt) is 06/22, and the Pricing Date (Prc Dt), when the price is set, is also 06/22. The size of the issue is provided as 300,000 (thousands). The state of the issue is "priced", which means a price has been set. The lead managers are BSC (Bear Stearns Corp) and CSFB (Credit Suisse First Boston).

For primary market trading of debt securities, a new issue may be handled by one dealer or a group of dealers (e.g., a syndicate). For a group, one dealer is typically the lead co-manager. Moreover, joint lead co-managers may be provided in some cases. Senior and junior co-managers may also be designated. Generally, when the dealer or dealers underwrite a new issue, they first obtain a feel for the level of interest in the issue from investors (via the investor's IOIs) before pricing the issue. An issue with a high degree of interest may be oversubscribed, while an issue with a low degree of interest may be undersubscribed. For oversubscribed issues, the dealers must allocate the available issues among the interested investors. For undersubscribed issues, there will be issues left over. The issue is then priced accordingly at the pricing date. Moreover, the dealers collect the IOIs prior to the pricing date in the process of book building.

The investor may click the button "IOI" next to an issue to submit an IOI for that issue, as well as view further details regarding the issue (see FIG. 5). Thus, in accordance with the invention, once the issue is announced, all investors have an equal opportunity to express an interest in purchasing it. Moreover, the issuing dealer has an opportunity to gauge the degree of interest in the issue prior to its launch from a large population of investors. Once the "IOI" button is selected, the interface of FIG. 5 is activated to allow the investor to view full details regarding the issue, and to enter details regarding the IOI.

The interface 400 also provides links to a home screen, a notices screen, and an indications submitted screen (see FIG. 7).

FIG. 5 shows an interface 500 that provides an investor with details of a particular issue, and allows the investor to create an indication of interest, for a new issue. The details may include a manager section 510, including the title, lead managers, bookrunners, and senior and junior co-managers. A checkbox or circle may also be provided to allow the investor to designate which manager is to receive the IOI, and whether the other co-managers (i.e., all of the other managers, regardless of status as lead, senior or junior) are to be informed that an IOI was sent to the selected manager. Any of the managers listed may be designated to receive an IOI (assuming they participate in the system as indicated by an asterisk). The darkened circle indicates the feature is selected, while an open circle indicates the feature is not selected. This notation will be following in other figures as well. The investor may click on the circle using a mouse or other pointing device to toggle the selection.

An interface section 520 allows the investor to enter information such as the size (dollar amount) of the issue that he or she is interested in purchasing. The investor may also enter the level, which may be market order, in which case the investor agrees to pay the market price that is set by the dealer, or limit spread, in which case the investor enters a maximum spread in terms of basis points, or enters a minimum required yield. The IOI type is also designated as being no minimum, in which case the investor agrees to buy any amount of issues below the requested quantity; minimum fill, in which case the minimum amount is specified for filling an order when there are multiple trades; or all or none, in which case the full amount must be filled in one trade, not multiple trades.

Moreover, the investor designates whether the IOI is to be re-confirmed or auto-accepted via the "Auto-Verify" check-boxes. "Yes" means the IOI is to be re-confirmed by the investor. "No" means the IOI is automatically accepted. Typically, for the investor's protection, the IOI must be reconfirmed when any information regarding the new issue changes, such as issue size, change in managers, timing of the issue, and so forth.

A comment field is also provided to allow the investor enter any notes that can be retrieved later. Additional information may also be accessed via a prospectus button, an IDs (identifiers) button, and a sell restrictions button.

Further details related to the issue are given in an interface section 530, including the Ccy/size, the coupon type, coupon frequency, first coupon date, redemption, debt ranking, maturity, announcement date, expiration price date and time, settlement date, day count, pricing benchmark (bmk), Moody's rating, S & P rating, Fitch IBCA rating (a European credit rating agency), the minimum bid size, and the minimum denomination. These details may be entered into the system manually by the dealers via corresponding dealer interfaces, and/or imported from a database. Moreover, the dealers and investors may provide inputs and receive outputs via their interfaces in any known manner, e.g., via keyboard, mouse or other pointing device, voice interface, audio interface, video screen, and so forth. Thus, references herein to activating a function by clicking a button or the like are just example implementations, as the invention is meant to encompass any known interface techniques.

At the bottom of the interface 500, by selecting the "submit" button, the investor may submit the IOI to the designated manager after making the desired selections.

Note that the buttons at the top of the interface 500 and other interfaces allow the investor to navigate between the different screens.

FIG. 6 shows an interface 600 that provides a notice to an investor when creating an indication of interest. The notice is required by applicable securities regulations. If the investor accepts the terms, the IOI is sent to the designated lead managers and co-managers. The dealers receive the IOIs from different investors over time following the announcement date, and determine the level of interest in the issue. A price may then be set accordingly when the issue is launched. At that time, the dealers may begin to fill the investors orders based on the terms provided by the investors via the interface 500. If an investor selected the auto-verify function, he or she will be prompted to confirm the IOI after the issue is launched. Once the IOI is confirmed, the order can be filled.

FIG. 7 shows an interface that allows an investor to monitor the real-time status of its IOIs. An activity alert pop up box 710 informs the investor that the IOI has been allocated (i.e., an amount of the issue has been set aside by the dealer for purchase by a particular investor). The alert pops up some time after the IOI has been submitted, typically later in the same day, or a number of days later, depending on the issue. This is valuable since the investor is immediately made aware of the allocation. Moreover, by clicking on the "Now" button, the display 720 appears, either on the same screen or on a new screen, to provide messages and issue details. In particular, the display 720 informs the investor that an allocation of $24,000,000 has been made, which is less than the requested quantity of $38,000,000. This is acceptable since the IOI type is "no minimum" (NM). The level, pay method and manager are also indicated as previously selected by the investor.

Using the indicated button, the investor can cancel the IOI, or verify the allocation. Moreover, further details of the issue may be provided, along with a history (e.g., when provided, and details) thereof by selecting the appropriate buttons in the display 720. The investor may also navigate among multiple pages to view additional IOIs that have been submitted using the previous ("prev") and "next" buttons.

FIG. 8 shows an interface 800 that displays final pricing information to an investor. This information is available when a new issue has been priced, which may be hours or days after the IOI has been submitted. The interface indicates that the trade is ready to be accepted and exported, e.g., to a back office/accounting function, an archive, and/or a custodian. By clicking on the "accept" button, the investor's request to purchase an issue will be filled by a dealer, with trade details that are acceptable to both parties. By clicking on the "cancel" button, the transaction is cancelled. Generally, the details of the final pricing interface 800 should agree with the criteria entered when the IOI was created (see FIG. 5). The allocation, price, and spread of the issue are shown in the region 810 of the interface 800.

FIG. 9 shows an interface 900 that displays an indication history to an investor. The indication history notes, for each inquiry, whether a price has been confirmed, an allocation has been verified, an allocation is available and should be verified, an IOI has been verified, an IOI should be reviewed and verified, or an IOI has been submitted. In the example shown, the IOI was initially submitted at 10:30 am via the interface 500. At time 10:35, the system prompted the investor to review and re-verify the IOI. At time 10:40, five minutes later, the IOI was verified. At time 13:36, an allocation was made available by the dealer, and the investor asked to verify. At time 13:37, the investor verified the allocation. At time 13:38, the price was confirmed.

FIGS. 10-18 are user interfaces for secondary market trading of debt securities in accordance with the present invention.

FIG. 10 shows an interface 1000 that allows an investor to selectively view an available inventory of security issues that are being offered or bid on by dealers in the secondary (resale) market. Advantageously, the invention increases liquidity and market efficiency by bringing together available issues from multiple dealers for easy access by investors on a common platform, with trade information provided in a standardized, sortable manner.

Moreover, the investor may select different inventories, e.g., from the buttons "US High Grade", which are investment-grade US securities, "USD Eurobond", which are US dollar denominated, and "EUR Eurobond", which are euro-denominated. Here, "US High Grade" is selected as indicated by the arrow (⇒). Additionally, the investor may view an inventory using the "inventory" button, or to conduct a trade of a selected issue in the inventory using the "trade" button.

Filters may also be selected by clicking a check box or the like to view offers, bids, or actively-traded securities ("actives"). Here, "offers" is selected. The investor seeking to buy an issue will select "offers" to view the offer or selling terms of the dealers, while an investor seeking to sell an issue will select "bids" to view the bid or buying terms of the dealers. Note that this is in contrast to the primary issue market, where the investors are only buyers. Moreover, not that while separate interfaces may be provided for offered and bid issues, it is possible to have a combined interface that lists both offered and bid issues.

The investor may enter the ticker or CUSIP designators for one or more issues of interest to obtain further information using the "search" button. The requested inventory appears on the screen 1000 in the region 1010, and the investor can select the particular issue of interest, e.g., using a pointing device or the like to click on the issue. Here, the issue "WORLDCOM INC" is selected as indicated by the arrow (⇒). In the region 1010, relevant information is provided for each issue, including the size (number of issues available, in thousands), the rating, the issuer, the ticker, the coupon (in percent), the maturity date, spread (the different between the bid and asked price in basis points, where one basis point=0.01%), any special flagged note, and the benchmark. The benchmark is usually expressed in terms of a percentage above a U.S. Treasury note rate, where the maturity date of the note is indicated. This is typically the most recently issued Treasury security of the given maturity, and is known as an "On-The-Run" Treasury. Its value is updated daily. For WORLDCOM INC, the benchmark is UST 5.750 11/05. A dealer identifier and an update field (which designates when the information for the issue was last updated) are also provided. A dealer identifier of *** indicates there are multiple dealers that cannot be indicated in the current screen space. The screen may be designed to accommodate multiple dealer identifiers if desired.

The particular issue details may be entered manually by the dealers at their respective interfaces, and/or imported from a database. Typically, many screens of new issues are presented that the user may navigate by paging through using the "prev" and "next" buttons. Only a few example issues are provided in the interface 1000 for clarity. Moreover, the issues may be sorted according to the various fields on the title bar, e.g., size, rating, issuer, ticker, coupon, maturity, spread, benchmark, dealer, or update time (when details of an issue were last updated by a dealer). This enables the investors to quickly and methodically locate and review issues of interest, and to obtain up-to-the minute updated information for each issue.

FIG. 11 shows an interface 1100 that allows an investor to view details of a selected issue. For example, the investor has selected the "WORLDCOM INC" issue. WCOM is the ticker of the issuer, and 7.550% is the coupon. The interface provides the corresponding details of each dealer's bids and offers, the inside market, and the freshness of the indicated price (in the "updated" field). In this example, the issue is offered by three dealers. If a time is given, it indicates an update in the current day. The inside market refers to the highest bid and the lowest ask prices made by a dealer for its own inventory. For example, the dealer BSC provides an offer with a size of 32,400 and a spread of 215 basis points. The dealer DB provides a bid with a size of 2,000 and a spread of 230 basis points, and an offer with a size of 3,000 and a spread of 215 basis points. The dealer UBSW provides an offer with a size of 6,733 and a spread of 217 basis points. Note that spread is correlated with yield, so a higher spread means a higher yield. Thus, a buyer seeks out the highest spread, and the seller seeks out the lowest spread.

The inventory detail interface 1100 thus allows the investor to immediately determine which of the multiple dealers provides the best terms for a particular issue of interest.

FIG. 12 shows an interface 1200 that allows an investor to enter an inquiry for a selected issue. After viewing the details of the selected issue in the interface 1100, the investor may wish to enter an inquiry for the issue to buy or sell it. The interface 1200 appears when the investor clicks on the "trade" button on the interface 1100. Using the check boxes shown, the investor may select an action of requesting a bid, or requesting an offer. Moreover, the investor may enter a firm price signaling that the investor intends to trade immediately, or the investor may enter an "indication" only, which is "subject to" (or "price subject") subsequent agreement on the price of the issue. Moreover, the investor may enter specific inquiry details, inquiry size, SD, inquiry type (where cash indicates a cash sale, and cross indicates an exchange of securities), and a benchmark, which is selected from a drop down tool, as indicated by the downward arrow (⇓).

In the region 1210, the investor may also select which of one or more dealers to poll (i.e., send the inquiry to). This is particularly advantageous since the investor may prefer to buy from specified dealers with whom the investor has a pre-existing relationship. Moreover, the investor may prefer specific dealers due to previous experiences, e.g., in successful settling. Advantageously, the invention allows an investor to choose to trade with a known dealer. In one possible implementation, the desired dealer may be selected by clicking on a button that toggles between YES and NO.

Moreover, the investor can obtain the best terms for a given issue since multiple dealers are competing for the investor's trade. In this regard, note that the "in competition" check box may be checked when the investor sends its inquiry to more than one dealer. The corresponding dealer interfaces (FIG. 13) inform each dealer that it is in competition with at least one other dealer, although preferably the identity of the competition is not specified to avoid collusion.

Furthermore, the investor may set a timer (or a default timer may be used) that indicates a time for the dealers to respond to the investor's firm price or indication/subject price, such as 5 minutes. In one possible implementation, the timer provides different times using a drop down tool. An activity log captures and time stamps all details of the inquiry and trade process, while a status log indicates the status of the inquiry. Here, these fields are empty since the inquiry has not yet been sent via the "submit" button.

FIG. 13 shows an interface 1300 that allows a dealer to view and respond to an investor's inquiry. Here, the dealer sees that a firm inquiry has been made (as opposed to a subject inquiry). The details of the issue are provided, along with an identifier of the sender (e.g., "macary at eclientj"). The time when the offer is due is also provided (5 minutes). There is no benchmark crossing since the inquiry type is cash. An additional notes field provides information to the dealer. Moreover, a status field indicates a response is requested. If desired, the dealer responds by entering details of an offer to the inquiring investor, including spread, benchmark, size and time limit for responding (e.g., three minutes), then clicking on "submit". Otherwise, the dealer may enter a pass, signaling that it is not interested in the trade. A timer 1310 indicates the time left for the dealer to respond to the inquiry. Note that the example three-minute time limit set by the dealer may not begin running immediately when the offer is submitted. Instead, it may begin to run when the offer is released from the holding bin, as discussed further below.

Each of the different dealers that were selected by the investor (via the interface 1200) view the interface 1300. The interface 1300 allows each dealer to see the details such as the investor's (client's) identity and the inquiry. Additionally, any non-standard details of the inquiry may be indicated, such as a non-standard settlement date.

The activity log indicates that the investor (whose identifier is "eclientj") has submitted an offer for 5,000,00 of the issue WCOM at a coupon of 7.550 and a maturity of Apr. 1, 2004. Optionally, the interface 1300 may inform the dealer that it is in competition with other dealers; that is, that the inquiry was sent to at least one other dealer. This can be enabled by the system by tracking whether an incoming inquiry from an investor has been addressed to multiple dealers, and sending data for producing a corresponding message on the dealer's interface 1300.

FIG. 14 shows an interface 1400 that allows an investor to view multiple dealer responses to the investor's inquiry, and accept an offer or bid, or provide a counteroffer. Here, the four dealers that the investor selected via the interface 1200 have submitted responses to the inquiry. In particular, as shown in the region 1410, the dealers ABN, BSC and CSFB have submitted offers, while the dealer DB has submitted a pass. Moreover, the best offer has been highlighted by the system. Here, ABN submitted the best offer since the spread of 192 basis points is above the spreads of BSC and CSFB (191 and 189 basis points, respectively). The system can select the best offer by determining the best spread, i.e., based on its magnitude. This can be achieved, e.g., using known algorithms that determine the minimum or maximum value in an array of numbers. The status field indicates that a response is requested, while the activity log indicates the details of each dealer's response.

In an important aspect of the invention, offers or bids from multiple dealers to one investor are stored in a conceptual "holding bin", and are subsequently released to the investor at the same time. The price timer then indicates the amount of time the investor has to respond by either selecting "counter" to provide a new counteroffer (by returning the user to the interface 1200), or "accept" to accept a specific dealer's offer or bid. When the investor provides a counteroffer, the dealer may then submit a further offer or bid in response. Repeated negotiation cycles may occur in this manner.

The price timer can be different for different dealers, and may be set by the "good for" field on the interface 1300. Here, the price timer has been set at three minutes for each dealer, and four seconds have passed since the concurrent release of the offers (thus, 2:56 remains). Optionally, default timer amounts may be used for the "due in" and/or "good for" times. The data center 220 may be used to implement this feature by withholding the transmission of the responses to the investor interfaces until the "due in" time set by the investor has elapsed. Optionally, a partial transmission is made to the investor interface such that the presence of the offer or bid from a specific dealer may be known, but not the details, e.g., regarding size, spread, benchmark, and GF (the "good for" time, until the timer expires).

This aspect of the invention improves the uniformity of the trade process by allowing an investor to consider all offers or bids together (at least for a time period equal to the smallest of the dealer-imposed time limits). The investor is relieved from having to decide whether to accept one offer or bid when another offer or bid may be received within seconds or minutes.

FIG. 15 shows an interface 1500 that allows an investor to confirm the details of a trade and to enter spot details. After the investor has accepted a particular dealer's offer or bid, spot negotiations may occur, where the investor confirms the spot vs. the investor's benchmark. The investor may accept or re-spot the benchmark via a counteroffer to complete the trade, by clicking on the "accept" or "counter" buttons, respectively. The dealer may impose a time limit for the investor to respond to the dealer's spot details, e.g., one minute, while the investor may impose a time limit for the dealer to respond to the investor's spot details. Or, the system may impose a default time limit.

Here, the status log notes that the spot is Awaiting Spot Confirmation (ASC), and the activity log notes, at 14:10:35, that the dealer (ABN) requests a 101-200 (4.874 yield) spot on the Treasury having a 6.125% rate and maturity of Aug. 31, 2002. This information is presented to the investor in the spot negotiation region 1510 of the interface 1500. Note that "101-200" denotes the value 101+20×1/32+0×1/8×1/32.

FIG. 16 shows an interface 1600 that confirms the price and spot details of a trade. The "status: filed" indicates the trade is done. The price is $99.990. As indicated by the activity log, the investor "eclientj" agreed on the final price at time 14:11:11, 36 seconds after it was received. The trade information provided by the interface may be exported as desired, e.g., to a back office/accounting function, an archive, and/or a custodian. An exportable audit trail shows the competitive bid/offer process. The activity log notes that the investor has accepted the dealer's spot at 10:53:29, four seconds after it was provided.

FIG. 17 shows an interface that allows an investor to view actively traded issues. From the inventory of available issues, the most actively traded issues may be identified and flagged in the system, e.g., based on an operator input. For example, the active trading status may be based on the size of the security when it was originally issued, e.g., whether the issue exceeded one billion dollars. Other criteria may also be used. Moreover, the most active issues can be designated for separate categories, such as financials, industrials, utilities, supra/sovereigns (supra-national refers to international organizations such as the International Monetary Fund or the World Bank), or for all issues, as indicated by the check boxes in the interface 1700. Also, the number of most active issues can be determined as a percentage of the number of issues, e.g., 5%, or as a fixed number, e.g., the top fifty issues. Furthermore, the active issues may be displayed in order of their relative activity, or based on other criteria, such as alphabetical by ticker or issue name, or by maturity date. The determination of active issues may be adjusted periodically, such as once a week.

Advantageously, by providing an inventory of actively traded issues which are expected to have high liquidity, a tradeable two-way market is created that allows an investor to submit an order (not an inquiry) to a dealer for quick execution. This avoids the need for the inquiry and response process described previously for secondary market issues. For example, for the issue AOL, the dealer JPM provides a bid of 122, and the dealer UBSW provides an offer of 121. "(5)" denotes an order size of five million.

FIG. 18 shows an interface that allows an investor to compare the bid and offers of different dealers for an actively traded issue, and to enter a buy order. Here, the bid and offer details, including size and spread are provided for the different dealers that offer the given issue (e.g., AOL). UBSW is highlighted since it provides the highest spread 121 basis points), which is most advantageous for the investor as buyer. In the Buy Order region 1810, the investor may enter the size of the order and indicate whether it is all or none. The investor may also indicate whether the trade is to be outright (cash) or a cross transaction (exchange or securities).

By clicking on the "submit" button, the order is sent and responded to by the dealer by accepting or rejecting it. Advantageously, unlike the inquiry process, no negotiations occur, so execution is faster.

Accordingly, it can be seen that the present invention provides a computer-implemented method for trading of debt securities. In one aspect of the invention, dealers announce new debt security issues to investors via respective computer-generated investor interfaces in a network. The investor interfaces allow the respective investors to communicate respective indications of interest in purchasing the new debt security issues to the dealers via respective computer-generated dealer interfaces. The dealers can allocate the debt security issues to the investors in accordance with their respective IOIs. Moreover, the investors can specify which dealers receive the IOIs.

In another aspect of the invention, an inventory of issues from multiple dealers is made available to investors on a secondary trading market in a searchable format. Again, the investor can choose which dealers to trade with for a given issue. Moreover, the investor may place multiple dealers in competition with one another for a trade. In this case, offers from the dealers are held in a holding bin and released to the investor concurrently to allow the investor to consider all offers together. The investors and dealers may also specify time limits for the other party to respond. Negotiation of spot details between the dealers and investors is also enabled.

In a further aspect of the invention, the dealers post bid and offer terms for actively traded issues that are updated in real-time to avoid the need for the inquiry procedure.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for negotiating the price of a traded security, comprising:
   a computer providing a trading interface and a message from a dealer with bid and/or offer terms for the security; and
   a data center enabled to communicate the security, and bid and/or offer terms therefor, to investors in a market,
      wherein the data center is enabled to receive a firm offer or an indication of interest for the security from a particular investor in the market,
         wherein the firm offer signals an intention to trade immediately by the particular investor;
      wherein the data center is enabled to communicate a message to the particular investor indicating whether the dealer accepts or rejects the firm offer, and enforcing limits on negotiation in response to the submitted inquiry,
      wherein the data center is enabled to receive a plurality of the available inventory from the plurality of dealers for display to and access by the plurality of investors;
      wherein the data center is enabled to display to the plurality of investors an available inventory of security issues on a standardized and sortable manner that are being offered or bid on by the plurality of dealers in a secondary resale market;
      wherein the data center is enabled to allow a plurality of dealers to provide a bid in response to the indication of interest,
      wherein the data center is enabled to store a bid from each of the plurality of dealers to the investor at substantially the same time, and
      wherein the data center is enabled to allow the investor to accept, reject, or provide a counter-offer to at least one bid.

2. A method for negotiating the price for a traded security using a trading interface, comprising:
   receiving a message from at least one dealer with at least one bid and offer terms for a security;
   communicating the security, and the at least one bid and offer terms thereof, to investors in a market;
   receiving from a particular investor firm offer or an indication of interest, for the security;
   enabling the at least one dealer to communicate a message to the particular investor indicating whether the dealer accepts or rejects the firm offer, and enabling negotiation in response to the submitted price;
   enforcing limits on said negotiation;
   receiving from the particular investor an intention to trade immediately by submitting the firm offer;
   receiving a plurality of the available inventory from the plurality of dealers for display to and access by the plurality of investors;
   displaying to the plurality of investors an available inventory of security issues on a standardized and sortable manner that are being at least one of offered and bid on by the plurality of dealers in a secondary resale market;
   enabling the plurality of dealers to provide a bid in response to the indication of interest;
   storing the bid from each of the plurality of dealers for a period of time;
   providing the stored bid from each of the plurality of dealers to the plurality of investors at substantially the same time; and
   enabling the plurality of investors to at least one accept, reject, or provide a counter-offer to at the least one bid.

3. The method of claim 2, further comprising:
   enabling the investor to select at least one dealer to which to submit an offer.

4. The method of claim 2, further comprising:
   enabling the investor to indicate to at least one dealer an additional status of the offer.

5. The method of claim 4, wherein the additional status is an in competition status.

6. The method of claim 4, wherein the additional status is a time within which a response to the offer must be submitted.

7. The method of claim 2, wherein the limits are a time within which a response to the offer must be submitted.

8. The method of claim 2, farther comprising the step of:
   sorting the different inventories according to a plurality of fields including size, rating, issuer, ticker, coupon, maturity, spread, benchmark, dealer, and update time when details of an different inventories are updated by at least one of the plurality of the dealers and investors.

9. The method of claim 8, wherein said displaying step further comprising the steps of:
   displaying simultaneously to the plurality of investors the available inventory of security issues on a standardized and sortable manner that are being offered and bid on by the plurality of dealers in a secondary resale market including issue identifier, coupon rate, details of each of the plurality of dealer bids and offers, the inside market, and the freshness of the indicated price, providing the plurality of investors information to determine in real-time which of the multiple dealers provides the best terms for a particular issue of interest.

10. The method of claim 9, further comprising the steps of:
   receiving from the plurality of investors a request comprising a bid, or requesting an offer;
   receiving from the plurality of investors inquiry details, inquiry size, SD, inquiry type where cash indicates a cash sale, and cross indicates an exchange of securities, and a benchmark;
   receiving from the plurality of inventors at least one specific dealer to send the inquiry allowing the inventor to target the at least one specific dealer to negotiate the price for the traded security; and
   receiving from the plurality of inventors a firm price signaling that the investor intends to trade immediately or an indication only, which is subject to subsequent agreement on the price of the issue.

11. The method of claim 10, further comprising the steps of:

transmitting to the plurality of dealers information to inform each of the plurality of dealers of competition between the plurality of dealers;

receiving a selection from the plurality of investors of the plurality of dealers;

displaying to the plurality of dealers selected by the plurality of investors details relating to the investor, including the investor identity and the investor inquiry;

displaying to the plurality of inventors responses to the inventor inquiry received from the plurality of dealers;

receiving from at least one of the plurality of dealers at least one of an acceptance of and offer, and acceptance of a bid and responses to the investor's inquiry, and accept an offer or bid, and a counteroffer responsive to the spreads determined for the traded security.

12. The method of claim 11, further comprising the steps of:

receiving from at least one of the plurality of investors at least one of an acceptance of and offer, acceptance of a bid, and a counteroffer responsive to the spreads determined for the traded security;

when a counteroffer is received from at least one of the plurality of investors, receiving from at least one of the plurality of dealers a further offer or bid in response; and repeating the negotiation between the plurality of dealers and the plurality of investors until at least one of the bid, offer and counteroffer is accepted.

13. The method of claim 12, further comprising the steps of:

displaying to the plurality of inventors the bids, offers and counter offers simultaneously for consideration by the plurality of investors; and receiving an acceptance from at least one of the plurality of investors;

initiating spot negotiations between the at least one of the plurality of inventors and at least one of the plurality of dealers wherein the investor confirms the spot versus a benchmark;

receiving at least one of an acceptance and a re-spot of the benchmark from the at least one of the plurality of inventors via a counteroffer to complete the trade.

14. The method of claim 13, further comprising the steps of:

identifying from the available inventory of the available issues, most actively traded issues based on at least one of size of the traded security when it was originally issued, designating the identified most actively traded issues in separate categories, including financials, industrials, utilities, international organizations.

15. The method of claim 14, wherein said identifying step further comprised the steps of:

identifying from the available inventory of the available issues, most actively traded issues based on at least one of size of the traded security when it was originally issued, and as a percentage of the number of issues; and displaying the active issues responsive to relative activity, thereby providing an inventory of actively traded issues which are expected to have high liquidity.

16. A method for negotiating the price for a traded security using a trading interface, comprising:

communicating a security, and bid and/or offer terms thereof, to investors in a market via the trading interface from at least one dealer;

enabling an investor to provide an indication of interest in purchasing the security to at least one dealer;

enabling a plurality of dealers to provide a bid in response to the indication of interest; storing a bid from each of the plurality of dealers for a period of time;

providing the stored bid from each of the plurality of dealers to the investor at substantially the same time;

enabling the investor to accept, reject or provide a counteroffer to at least one bid; and enforcing limits on the negotiation;

displaying simultaneously to the plurality of investors an available inventory of security issues on a standardized and sortable manner that are being offered and bid on by the plurality of dealers in a secondary resale market; and selecting, by the plurality of investors, different inventories from the available inventory, using a plurality of filters for displaying of the different inventories comprising offers, bids, and actively-traded securities, enabling investors to be buyers and sellers of the different inventories for the secondary resale market.

17. The method of claim 16, wherein the indication of interest further comprises a firm offer or a subject to negotiation indication.

18. The method of claim 16, further comprising:

enabling the investor to select at least one dealer to which to submit an indication of interest.

19. The method of claim 16, further comprising:

enabling the investor to indicate to at least one dealer an additional status of the offer.

20. The method of claim 19, wherein the additional status is an in competition status.

21. The method of claim 19, wherein the additional status is a time within which a response to the offer must be submitted.

22. The method of claim 16, wherein the limits are a time within which a response to the offer must be submitted.

23. The method of claim 18, further comprising the steps of:

receiving a plurality of the available inventory from the plurality of dealers for display to and access by the plurality of investors; and displaying to the plurality of investors an available inventory of security issues on a standardized and sortable manner that are being offered or bid on by the plurality of dealers in a secondary resale market.

24. The method of claim 23, further comprising the steps of:

selecting, by the plurality of investors, different inventories from the available inventory, comprising investment-grade US securities and Eurobond securities; and trading by the plurality of investors of the different inventories from the available inventory.

25. The method of claim 23, further comprising the step of:

sorting the different inventories according to a plurality of fields including size, rating, issuer, ticker, coupon, maturity, spread, benchmark, dealer, and update time when details of an different inventories are updated by at least one of the plurality of the dealers and investors.

26. The method of claim 25, wherein said displaying step further comprising the steps of:

displaying simultaneously to the plurality of investors the available inventory of security issues on a standardized and sortable manner that are being offered and bid on by the plurality of dealers in a secondary resale market including issue identifier, coupon rate, details of each of the plurality of dealer bids and offers, the inside market, and the freshness of the indicated price, providing the plurality of investors information to determine in real-time which of the multiple dealers provides the best terms for a particular issue of interest.

27. The method of claim 26, further comprising the steps of:

receiving from the plurality of investors a request comprising a bid, or requesting an offer;

receiving from the plurality of investors inquiry details, inquiry size, SD, inquiry type where cash indicates a cash sale, and cross indicates an exchange of securities, and a benchmark;

receiving from the plurality of inventors at least one specific dealer to send the inquiry allowing the inventor to target the at least one specific dealer to negotiate the price for the traded security; and receiving from the plurality of inventors a firm price signaling that the investor intends to trade immediately or an indication only, which is subject to subsequent agreement on the price of the issue.

28. The method of claim 27, further comprising the steps of:

transmitting to the plurality of dealers information to inform each of the plurality of dealers of competition between the plurality of dealers;

receiving a selection from the plurality of investors of the plurality of dealers;

displaying to the plurality of dealers selected by the plurality of investors details relating to the investor, including the investor identity and the investor inquiry;

displaying to the plurality of inventors responses to the inventor inquiry received from the plurality of dealers;

receiving from at least one of the plurality of dealers at least one of an acceptance of and offer, and acceptance of a bid and responses to the investor's inquiry, and accept an offer or bid, and a counteroffer responsive to the spreads determined for the traded security.

29. The method of claim 28, further comprising the steps of:

receiving from at least one of the plurality of investors at least one of an acceptance of and offer, acceptance of a bid, and a counteroffer responsive to the spreads determined for the traded security;

when a counteroffer is received from at least one of the plurality of investors, receiving from at least one of the plurality of dealers a further offer or bid in response; and repeating the negotiation between the plurality of dealers and the plurality of investors until at least one of the bid, offer and counteroffer is accepted.

30. The method of claim 29, further comprising the steps of:

displaying to the plurality of inventors the bids, offers and counter offers simultaneously for consideration by the plurality of investors; and receiving an acceptance from at least one of the plurality of investors;

initiating spot negotiations between the at least one of the plurality of inventors and at least one of the plurality of dealers wherein the investor confirms the spot versus a benchmark;

receiving at least one of an acceptance and a re-spot of the benchmark from the at least one of the plurality of inventors via a counteroffer to complete the trade.

31. The method of claim 30, further comprising the steps of:

identifying from the available inventory of the available issues, most actively traded issues based on at least one of size of the traded security when it was originally issued, designating the identified most actively traded issues in separate categories, including financials, industrials, utilities, international organizations.

32. The method of claim 31, wherein said identifying step further comprised the steps of:

identifying from the available inventory of the available issues, most actively traded issues based on at least one of size of the traded security when it was originally issued, and as a percentage of the number of issues; and displaying the active issues responsive to relative activity, thereby providing an inventory of actively traded issues which are expected to have high liquidity.

* * * * *